United States Patent [19]

Brooks et al.

[11] Patent Number: 5,659,298
[45] Date of Patent: Aug. 19, 1997

[54] METHOD AND APPARATUS FOR DELIVERING MESSAGES IN A COMMUNICATION SYSTEM

[75] Inventors: Barbara Brooks, Tempe; David Terris, Phoenix, both of Ariz.

[73] Assignee: Motorola, Inc., Schaumburg, Ill.

[21] Appl. No.: 606,806

[22] Filed: Feb. 26, 1996

Related U.S. Application Data

[63] Continuation of Ser. No. 270,568, Jul. 5, 1994, abandoned.

[51] Int. Cl.[6] ................................................ H04Q 1/00
[52] U.S. Cl. .................... 340/825.44; 455/38.1; 340/825.21
[58] Field of Search ............... 340/825.44, 825.03; 370/94.1; 455/38.1, 12.1, 13.1; 379/57

[56] References Cited

U.S. PATENT DOCUMENTS

| | | | |
|---|---|---|---|
| 4,644,347 | 2/1987 | Lucas | 340/825.44 |
| 4,644,351 | 2/1987 | Zabarsky | 340/825.44 |
| 4,849,750 | 7/1989 | Andros | 340/825.44 |
| 4,897,835 | 1/1990 | Gaskill | 340/825.44 |
| 4,914,649 | 4/1990 | Schwendeman | 340/825.44 |
| 5,394,560 | 2/1995 | Kane | 340/825.44 |
| 5,408,237 | 4/1995 | Patterson | 455/173.1 |

FOREIGN PATENT DOCUMENTS

0365885  2/1990  European Pat. Off. .

*Primary Examiner*—Brian Zimmerman
*Attorney, Agent, or Firm*—Walter Nielsen; Sherry Whitney

[57] ABSTRACT

A satellite communication system for delivering simplex messages to subscribers comprises multiple Message Origination Controllers (MOCs), one or more Message Termination Controllers (MTCs), satellites, and geographically-diverse communication units. Messages destined for particular communication units are transmitted to the one or more MTCs. The one or more MTCs then schedule delivery of the messages to communication units by employing a blocked timing structure for delivery of the messages. The one or more MTCs transmit the scheduled messages to satellites which broadcast the messages to communication units at the scheduled time. Communication units are assigned specific timing blocks during which they monitor radio signals for messages directed to them. During non-assigned timing blocks, communication units remain in a low-power state.

21 Claims, 6 Drawing Sheets

METHOD AND APPARATUS FOR DELIVERING MESSAGES IN A COMMUNICATION SYSTEM

This application is a continuation of prior application Ser. No. 08/270,568, filed on Jul. 5, 1994 now abandoned.

RELATED INVENTIONS

This application is related to co-pending U.S. patent application Ser. No. 07/845,413, filed on Mar. 3, 1992, entitled "Paging System", which is assigned to the same assignee as the present application.

FIELD OF THE INVENTION

The present invention relates generally to radio frequency data communications. More specifically, the present invention relates to simplex systems in which data communications are directed to addressable message receivers.

BACKGROUND OF THE INVENTION

Simplex data communication systems, also known as one-way or passive systems, are employed in connection with paging. Generally speaking, one or more transmitters broadcast data communications, referred to herein as "messages", which originate from one or more communication units. The originating communication units are referred to herein as "source units". The messages include data which identify specific receivers (e.g., pagers). A population of receivers receives the broadcast messages. When one of the population of receivers identifies a message directed to it, it informs the person or device possessing the receiver that an incoming message has been received. The receiver often displays a numeric or alphanumeric representation of information contained within the message. The specific receiver to which a message is directed is referred to herein as a "target unit". The person or device possessing a transmitter or receiver is referred to herein as a "subscriber". Due to the simplex nature of such systems, the system does not know when a target unit fails to receive a message directed to it.

On the other hand, these simplex systems have many desirable features. Due to the absence of a transmitter and signal transmission capabilities in the receiver, a small, light-weight, readily-portable, and inexpensive unit results. However, one problem with a portable unit is that the unit's power is limited as the power is typically provided by batteries.

Conventional paging systems experience a problem related to a limited range. A paging system works optimally when its pagers reside within the area covered by the system's transmitters. When subscribers travel outside this area, their pagers cannot usually receive calls. This problem is exacerbated by the simplex nature of the system which prevents the system or the source unit from knowing whether the call was actually received by the target unit.

A related problem is that of limited paging capacity. As an area of coverage increases to better serve subscriber needs, the population of pagers likewise increases. As the population of pagers increases, the number of data communications increases. Thus, as the coverage area increases, a point of diminishing returns is reached. The number of data communications may become so great that an unacceptable delay in the delivery of messages is experienced.

Another problem with conventional paging systems is concerned with multipathing, interference, signal reflections, and the like. Generally, pagers are worn by subscribers while engaging in their normal daily activities. These normal activities may place the subscribers inside automobiles or buildings, near large electrically-grounded structures, and in other spaces that electromagnetic signals have trouble penetrating. Consequently, the pagers' abilities to receive messages varies considerably. To maximize a pager's ability to receive messages in all surroundings within a coverage area, paging systems are typically designed to utilize a low data-rate frequency shift key (FSK) modulation scheme in which transmitter power is boosted to a level that achieves an acceptable link margin. In addition, in simulcast paging systems the number of system transmitters may be multiplied and geographically distributed throughout the covered area. The determination of an adequate number of transmitters and adjustment of power levels to achieve an acceptable link margin throughout the coverage area is typically a slow, trial-and-error process. This process is slowed even further by the simplex nature of the system which prevents system operators and the call senders from knowing whether messages are actually being received by the target units.

The use of satellites in paging has also been proposed. Satellites would contain system transmitters and would broadcast messages to populations of target units in a manner which in some respects is similar to that used by fixed, ground-based transmitters. The use of satellites may address the limited range problem of conventional pager systems. Because a satellite may be located far above the earth's surface, the satellite's RF transmissions may more easily reach target units without interference. For example, geostationary satellites or satellites that move with respect to the surface of the earth (e.g., low-earth or medium-earth orbiting satellites) may theoretically be used. However, the use of satellites presents its own problems.

Satellites are typically constrained to using only low-power transmissions. Geostationary satellites are currently used to broadcast to terrestrial repeaters which can then transmit high power signals to nearby pagers. Proposals have been made to integrate a satellite with terrestrial transmitters in a simulcast paging system. However, this requires a satellite in a geostationary orbit, where the satellite is positioned a vast distance above the earth, where the satellites' transmission signal is extremely weak at the surface of the earth, and where the area of coverage on the earth's surface is exceptionally large.

Satellites orbiting nearer the earth could also contain system transmitters. Because the coverage of a satellite decreases as it nears the earth's surface, multiple satellites would be required to provide an appreciable area of coverage on the surface of the earth. A system having multiple satellites presents the problem of coordinating messages and routing them to a proper satellite that is servicing a target unit.

What is needed is a simplex data communication system capable of coordinating and delivering messages without interference to target units located in geographically-diverse areas outside the range of a single system transmitter. What is further needed is a system with the ability to deliver messages to a large area of the earth's surface without invasive antenna structures. What is further needed is a system that provides a high probability that a target unit will receive messages addressed to it.

BRIEF DESCRIPTION OF THE DRAWING

The invention is pointed out with particularity in the appended claims. However, a more complete understanding of the present invention may be derived by referring to the detailed description and claims when considered in connection with the figures, wherein:

The exemplification set out herein illustrates a preferred embodiment of the invention in one form thereof, and such exemplification is not intended to be construed as limiting in any manner.

DETAILED DESCRIPTION

The present invention provides a simplex data communication system capable of coordinating and delivering messages without interference to target units located in geographically-diverse areas outside the range of a single system transmitter. Further, the present invention provides a system with the ability to deliver messages to a large area of the earth's surface without invasive antenna structures. Still further, the present invention provides a system with a high probability that a target unit will receive messages addressed to it.

Figure 1:
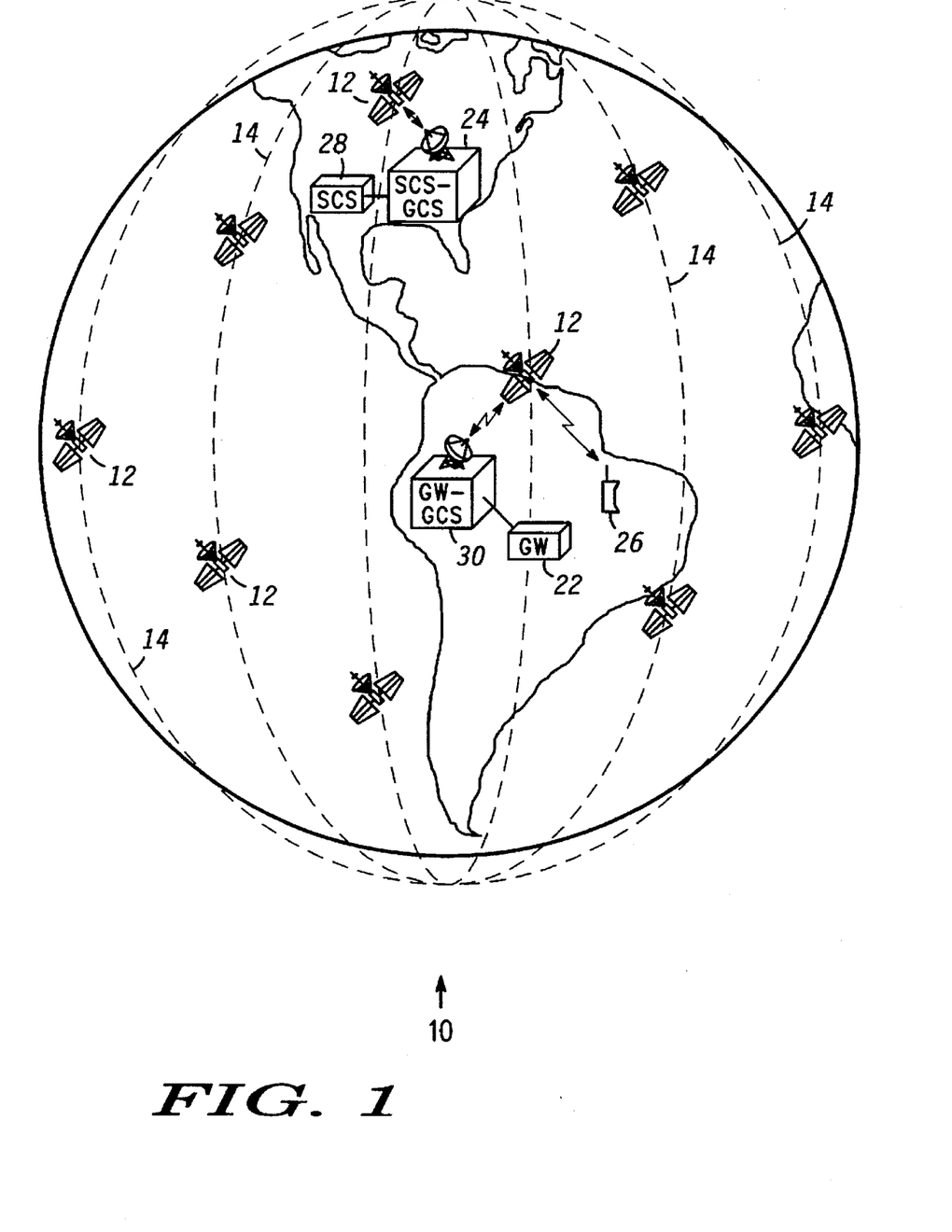
FIG. 1 shows a diagram depicting a simplex data communication system configured in accordance with a preferred embodiment of the present invention.

FIG. 1 shows a diagram depicting a simplex data communication system configured in accordance with a preferred embodiment of the present invention. The simplex data communication system 10 is dispersed over and surrounding a celestial body (e.g., earth) through use of orbiting satellites 12.

Satellites 12 occupy orbits 14 that may be low-earth orbits, medium-earth orbits, geosynchronous orbits, or a combination thereof. Low-earth orbits are generally at an altitude of about 600 km to 2000 km, medium-earth orbits at about 2000 km to 20,000 km and geosynchronous orbits at about 42,165 km, but other altitudes can also be used. In the example shown, communications system 10 uses six polar orbit planes, with each orbit plane holding eleven satellites 12 for a total of sixty-six satellites 12. However, this is not essential and more or fewer satellites, or more or fewer orbit planes or combinations of orbiting and geosynchronous satellites, may be used. For clarity, FIG. 1 illustrates only a few of satellites 12.

Satellites 12 communicate with terrestrial equipment using on-board transmission antennas. Satellite-to-terrestrial equipment communications may be in the form of direct transmissions to specific terrestrial equipment or broadcast transmissions. Terrestrial equipment may be, for example, a Subscriber Unit 26 (SU). FIG. 1 shows Unit' 26 (SU) which is an individual communication terminal which communicates directly with satellites 12 via radio links. For example, SUs 26 may be hand-held, portable cellular pagers. SUs 26 may also be cellular telephones adapted to transmit subscriber data to and receive subscriber data from satellites 12. "Subscriber data" is defined herein as data (e.g., numeric or alphanumeric paging data) terminating at or originating from an SU 26. SUs 26 comprise a receiver, a means of identifying and displaying messages, and a power source (e.g., a battery). When an SU 26 is a cellular telephone, it may additionally comprise a transmitter and an audio input-output device. SUs 26 may be target units for messages sent by source units. In FIG. 1, only one SU 26 is shown. However, a system such as shown in FIG. 1 may contain millions of SUs 26.

A source unit originates communication of a message by generating a "message request" that designates a specific target unit. When an SU 26 is a cellular telephone, it may function as a source unit. Alternatively, a ground-based telephone unit connected to a PSTN (not shown in FIG. 1) may be a source unit.

Because messages are not continuously being broadcast to each SU 26, it is not necessary that each SU 26 continuously monitor the radio waves. Thus, in a preferred embodiment, each SU 26 only monitors the radio waves broadcast by satellites 12 during particular blocks of time. These blocks of time are referred to herein as "messaging blocks". This provides the advantage of preserving limited power of the SUs 26. Selectively monitoring radio waves by SUs 26 is described in connection with a description of a method for controlling delivery of messages shown in FIG. 7.

Satellites 12 also communicate with at least one ground-based System Control Segment Ground Communication Station 24. A "Ground Communication Station" (GCS) is defined herein as a terrestrial communication facility capable of interfacing ground based equipment (e.g., System Control Segment 28) with satellites 12. FIG. 1 shows System Control Segment GCS 24 (SCS-GCS) associated with System Control Segment 28. SCS-GCSs 24 perform data transfer and telemetry, tracking, and control functions for the constellation of satellites 12.

A "System Control Segment" 28 (SCS) is defined herein as a control facility, typically ground-based, which controls operation of communication system 10. SCS 28 communicates with the rest of communication system 10 via SCS-GCS 24. SCS 28 need not be co-located with SCS-GCS 24. SCS 28 is preferably coupled to SCS-GCS 24 via land-lines, although this is not essential. In an alternate embodiment, SCS 28 may be coupled to SCS-GCS 24 via fiber optic links, radio links or other transmission mediums.

A "Gateway" 22 (GW) is defined herein as an equipment facility, typically ground-based, which is capable of interfacing GW-GCS 30 (and thus satellites 12) with ground-based equipment such as, for example, a public switched telephone network (PSTN) or a ground-based cellular network, not shown. GWs 22 communicate with the rest of communication system 10 via GW-GCSs 30. GWs 22 need not be co-located with GW-GCSs 30. GWs 22 are preferably coupled to GW-GCSs 30 via land-lines, although this is not essential. In an alternate embodiment, GWs 22 may be coupled to GW-GCSs 30 via fiber optic links, radio links or other transmission mediums.

A GW 22 desirably contains a database of subscriber information and a Message Origination Controller (MOC). A MOC is a message control segment that receives input message requests from source units, and accesses relevant subscriber information necessary to construct a Message Delivery Request (MDR), which comprises deliverable messages. For example, a source unit may connect to the MOC through a PSTN or a ground-based cellular communication system.

In a preferred embodiment of the invention, also referred to as a "distributed-MTC system", each GW 22 also comprises a Message Termination Controller (MTC). A MTC is a message control segment that receives MDRs from the GWs 22 and schedules the delivery of messages to the satellites 12 to be broadcast to SUs 26. The MOC and MTC need not be separate devices. The MOC and the MTC may be part of the same control device although they perform different functions. The distributed-MTC system is more fully described in conjunction with FIG. 3.

In an alternate embodiment of the invention, also referred to as a "centralized-MTC system", each GW 22 does not contain an MTC. Instead, one MTC exists for the communication system and is located in SCS 28. The centralized-MTC system is more fully described in conjunction with FIG. 4.

Figure 2:
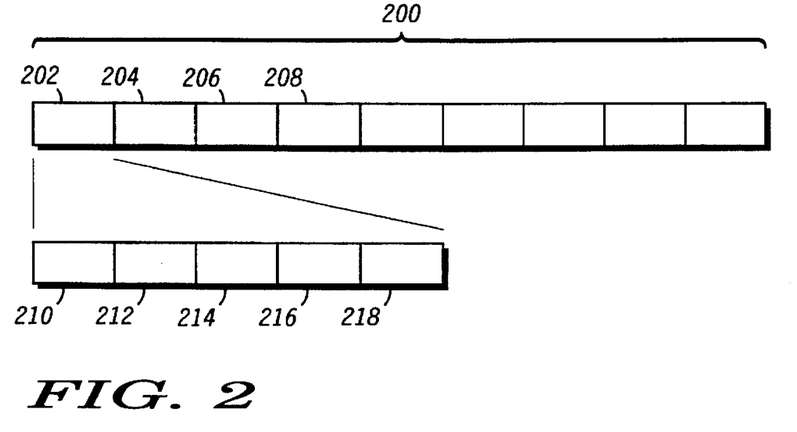
FIG. 2 shows a block diagram of a data protocol used in transmitting messages in accordance with a preferred embodiment of the present invention.

FIG. 2 shows a block diagram of a data protocol used in transmitting messages in accordance with a preferred embodiment of the present invention. FIG. 2 illustrates a diagram of a timing frame showing the messaging structure of radio signals broadcast from satellites 12 to SUs 26. A superframe 200 is divided into multiple timing blocks 201–209. In a preferred embodiment, nine timing blocks are used. However, as would be obvious to those of skill in the art based on the description herein, more or fewer timing blocks may be used. In a preferred embodiment, each SU 26 is assigned one of the multiple timing blocks 201–209. For example, random assignment of the timing blocks 201–209 to each SU 26 may be performed in the factory and programmed into the memory of each SU 26. Each SU 26 monitors the radio waves for messages only during its assigned timing block 201–209. The advantage of this timing structure is that battery life within each SU 26 is extended. Each SU 26 may remain de-energized during N–1 timing blocks, where N equals the number of timing blocks in the superframe 200. Each SU 26 energizes, or "wakes up" only during its assigned timing block.

Each timing block 202–208 is divided into multiple groups 210–218. In a preferred embodiment, each block is divided into five groups 210–218. Desirably, the first group 210 is an acquisition group that contains information needed by the SUs 26. The acquisition group 210 allows each SU to synchronize to the transmission and receive instructions as to when to wake up to receive messages to be transmitted to it. The acquisition group 210 is always transmitted, even when there are no messages to be transmitted during the timing block 202–208. The remaining groups 212–218 are message groups which may contain messages to be delivered. To conserve battery power, an SU is normally preprogrammed to receive messages during only a predetermined one of message groups 212–218.

Figure 3:
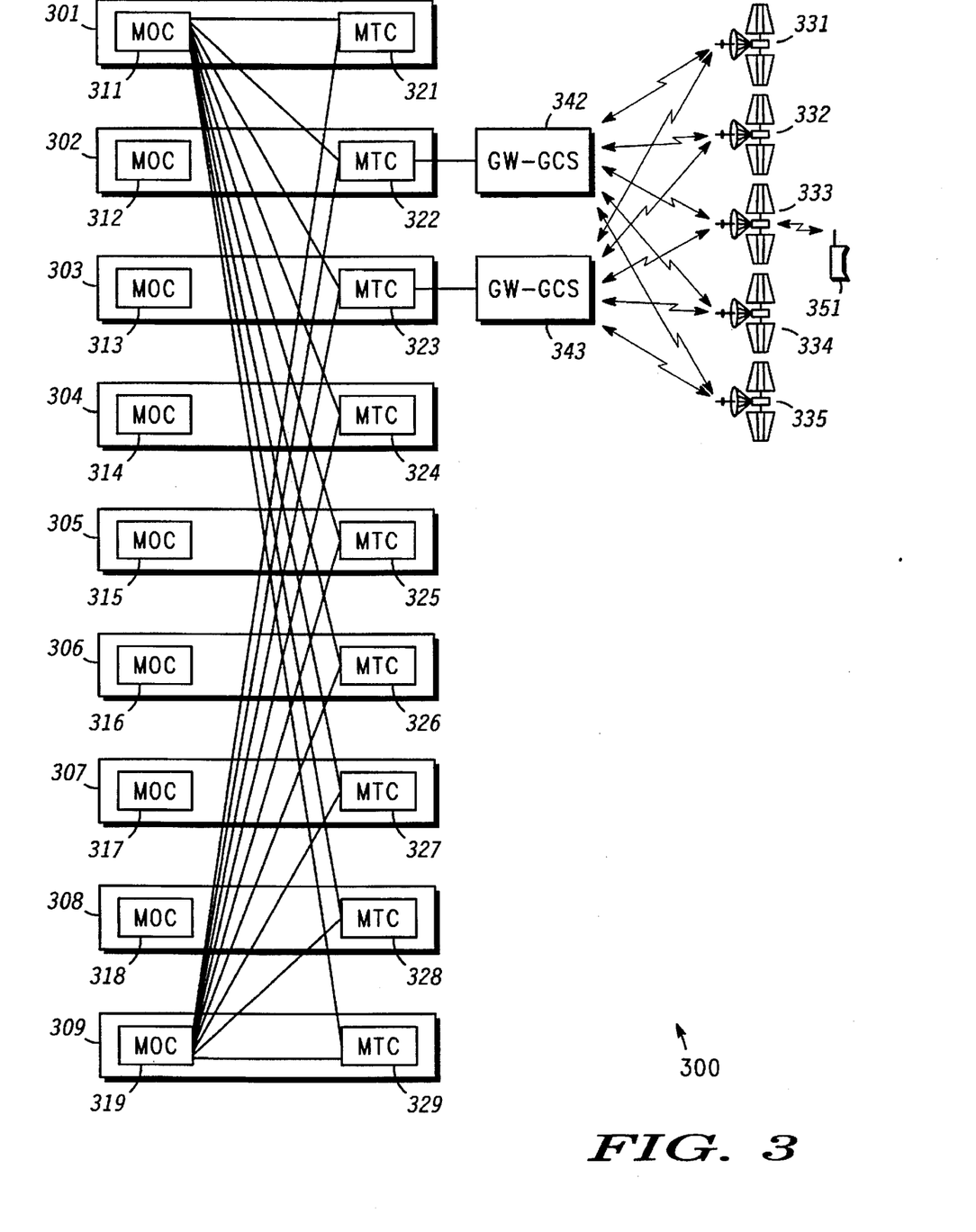
FIG. 3 shows a distributed-MTC system in accordance with a preferred embodiment of the present invention.

FIG. 3 shows a distributed-MTC system 300 in accordance with a preferred embodiment of the present invention. A distributed-MTC system 300 comprises GWs 301–309 (each having an MOC 311–319 and an MTC 321–329), GW-GCSs 342, 343, satellites 331–335, and SUs (e.g., SU 351). The GWs 301–309 are capable of communicating with each other via land-lines or other transmission media. Additionally, the GWs 301–309 are capable of communicating with satellites 331–335 via GWGCSs 342, 343. Satellites 331–335, in turn communicate with SUs (e.g., SU 351). In FIG. 3, nine GWs 301–309, two GW-GCSs 342, 343, five satellites 331–335, and one SU 351 are shown for exemplary purposes. It is obvious to those of skill in the art based on the description herein that more or fewer GWs 301–309, GW-GCSs 342, 343, satellites 331–335, and SUs 351 may be used. Additionally, a GW-GCS 342–343 would be associated with each GW 301–309. Additionally in FIG. 3, connections between MOCs 311–319 and MTCs 321–329 are shown only for MOC 311 and MOC 319 for clarity and ease of understanding. Connections desirably would exist between all MOCs 311–319 and MTCs 321–329. These connections may be land-lines or other transmission media. Although connections are shown between GW-GCSs 342, 343 and satellites 331–335, connections are capable of existing only when the satellites 331–335 are capable of communicating with GW-GCSs 342, 343. For example, a satellite 331–335 may be incapable of communicating directly with a particular GW-GCS 342, 343 when the satellite 331–335 is located on the opposite side of the earth as the particular GW-GCS 342, 343. The satellite 331–335 may, however, be capable of establishing indirect communications with the particular GW-GCS 342, 343 through cross-links with other satellites 331–335.

In a preferred embodiment, each MTC 321–329 is assigned one or more transmit timing blocks corresponding to the receive timing blocks 202–208 (FIG. 2) assigned to SUs 26 (FIG. 1). When a message request is received by a GW's MOC 311–319, the MOC 311–319 generates an MDR and determines which GW's MTC 321–329 is assigned the timing block that is the same as the receive timing block for the target unit specified in the message request. The MOC 311–319 then transmits the MDR to the GW 301–309 with the appropriate MTC 321–329. In some cases, the MTC 321–329 corresponding to the proper transmit timing block may be the MTC 321–329 that is resident in the same GW 301–309 as the MOC 311–319 that received the message request. In such a case, the MOC 311–319 forwards the MDR to the MTC 321–329 in its same GW 301–309.

After the MTC 321–329 receives an MDR, the MTC 321–329 sorts the information contained within the MDR and schedules delivery of the information. The MTC 321–329 collects all the MDRs and sorts received MDRs according to which satellite 331–335 should be in position to broadcast the information to the target unit (e.g., SU 351). Thus, the MTC 321–329 must have knowledge of the locations of the target unit and the satellites 331–335. These sorted MDRs are processed into Message Delivery Orders (MDO). Each MDO contains a batch of messages to be transmitted by the MTC 321–329 to a particular satellite 331–335 at a particular time. The MTC 321–329 schedules the MDOs for delivery. The MTC 321–329 schedules delivery based on delivery opportunities (in the assigned timing block). The MTC 321–329 then transmits the MDOs, via GW-GCS 342, 343, at the scheduled time to the appropriate satellite 331–335.

The appropriate satellite 331–335 then strips control information from the MDO and broadcasts the information contained within the MDO during the target unit's assigned timing block. This transmission is desirably done using an RF signal and is sent at signal strength levels which allow a target unit within the RF beam to receive the message through buildings, cars, and airplanes. The target unit (e.g., SU 351) should have energized itself during its assigned timing block and should be capable of receiving its message.

In a preferred embodiment, an MTC 321–329 may transmit MDOs to satellites 331–335 multiple times to increase the likelihood that a message is ultimately received by a target unit. For example, a message may not be received because some geographic formation (e.g., a mountain) existed between the satellite 331–335 that first broadcast the message to the target unit. If the MTC 321–329 retransmits the MDO to the same or a different satellite 331–335 after a period of time has elapsed, the satellite 331–335 and the target unit may be oriented such that no obstruction exists between them. Thus, the message would more likely be received by the target unit.

An example will clarify the concept of a preferred embodiment. Assume that in FIG. 3, the MTCs 321–329 are assigned transmit timing blocks in sequential order. Thus, MTC 321 is assigned transmit timing block 1 (e.g., timing block 202, FIG. 2), MTC 322 is assigned transmit timing block 2 (e.g., timing block 204, FIG. 2), and so on. Additionally, assume that SU 351 is a target unit that was randomly assigned receive timing block 4 (e.g., timing block 208, FIG. 2). For example, a source unit (not shown in FIG. 3) may make a message request to MOC 311 specifying SU 351 as the target unit. The source unit may be, for example, a cellular or terrestrial telephone that is directly or indirectly connected to MOC 311 (e.g., via a PSTN). MOC 311 generates an MDR and evaluates the message request to determine which MTC 321–329 the MDR should be sent to.

Because MTC 324 is assigned the same timing block as the SU 351, MOC 311 transmits the MDR to MTC 324. MTC 324 then determines the location of SU 351, and determines which satellite 331–335 should be broadcasting messages to SU 351 at a future time. MTC 324 then generates and schedules delivery of an MDO to the appropriate satellite (e.g., satellite 333 as shown in FIG. 3), and transmits the MDO to the satellite 333 prior to the scheduled block time. The satellite 333 then broadcasts the information contained within the MDO during a fourth timing block (e.g., timing block 208, FIG. 2). SU 351 energizes itself during the fourth timing block and should be capable of receiving its message.

Figure 4:
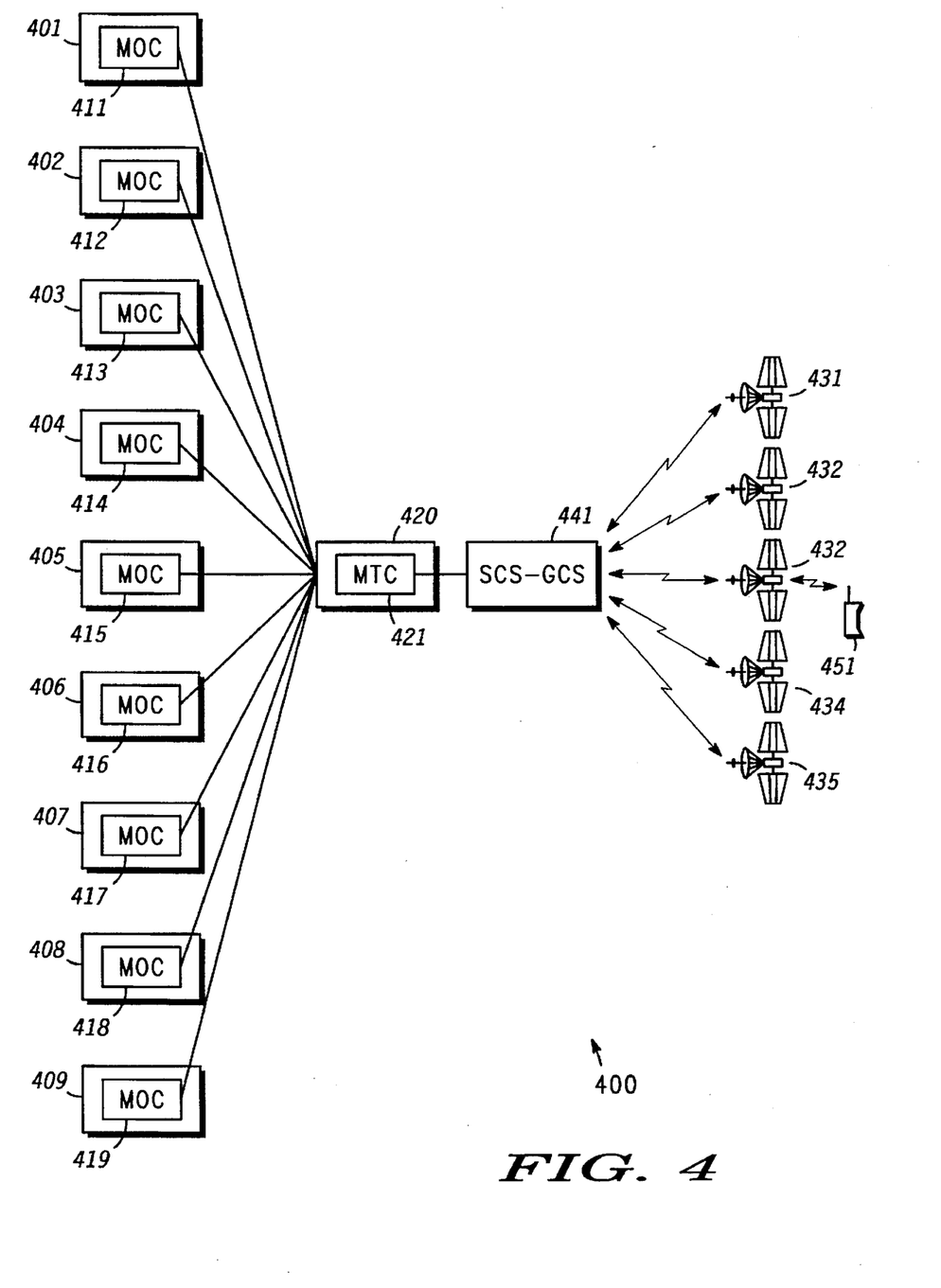
FIG. 4 shows a centralized-MTC system in accordance with an alternate embodiment of the present invention.

FIG. 4 shows a centralized-MTC system 400 in accordance with an alternate embodiment of the present invention. A centralized-MTC system desirably comprises GWs 401–409 (each having an MOC 411–419), SCS 420 (having MTC 421), SCS-GCS 441, satellites 431–435 and SUs (e.g., SU 451). The GWs 401–409 are capable of communicating with SCS 420 via land-lines or other transmission media. SCS 420 is capable of communicating with satellites 431–435 via SCS-GCS 441. Satellites 431–435, in turn communicate with SUs (e.g., SU 451). In FIG. 4, nine GWs 401–409, one SCS 420 and SCS-GCS 441, five satellites 431–435, and one SU 451 are shown for exemplary purposes. It will be obvious to those of skill in the art based on the description herein that more or fewer GWs 401–409, SCSs 420 and SCS-GCSs 441, satellites 431–435, and SUs 451 may be used. Additionally in FIG. 4, connections between MOCs 411–419 and SCS 420 may be land-lines or other transmission media. Although connections are shown between SCS-GCSs 441 and satellites 431–435, connections are capable of existing only when the satellites 431–435 are capable of communicating with SCS-GCSs 441.

A centralized-MTC system differs from a distributed-MTC system described in conjunction with FIG. 3 in that the functions of the MTCs 321–329 (FIG. 3) are centralized within a single MTC 421 in SCS 420. When a message request is received by a GW's MOC 411–419, the MOC 411–419 generates an MDR and transmits the MDR to MTC 421. MTC 421 then sorts the information contained within the MDR and schedules delivery of the information. MTC 421 collects all the MDRs and sorts received MDRs according to which satellite 431–435 should be in position to broadcast the information to the target unit (e.g., SU 451).

Thus, MTC 421 must have knowledge of the locations of the target unit and the satellites 431–435. These sorted MDRs are processed into Message Delivery Orders (FIDO). Each MDO contains a batch of messages to be transmitted by the MTC 421 to a particular satellite 431–435 at a particular time. MTC 421 schedules the MDOs for delivery. MTC 421 schedules delivery based on delivery opportunities (in the assigned timing block). MTC 421 then transmits the MDOs, via SCS-GCS 441, at the scheduled time to the appropriate satellite 431–435.

The appropriate satellite 431–435 then strips control information from the MDO and broadcasts the information contained within the MDO during the target unit's assigned timing block. This transmission is desirably done using an RF signal and is sent at signal strength levels which allow a target unit within the RF beam to receive the message through buildings, cars, and airplanes. The target unit (e.g., SU 451) should have energized itself during its assigned timing block and should be capable of receiving its message. As with a distributed-MTC system 300 (FIG. 3), MTC 421 may retransmit MDOs to satellites 431–435 to increase the likelihood of a target unit receiving a message.

The centralized-MTC system has the advantage that one facility has all the information needed to schedule and control message delivery. The distributed-MTC system has the advantage of being able to handle a greater quantity of message deliveries because the scheduling and delivery tasks are distributed among different facilities.

The blocked superframe structure provides the coordination and control required to avoid conflicting time and frequency demands potentially imposed on satellites. Another advantage of the distributed-MTC system is that it has an inherent backup capability. If the message delivery capacity of an MTC or a GW is diminished, its message delivery opportunities may be reallocated to another MTC and GW.

Figure 5:
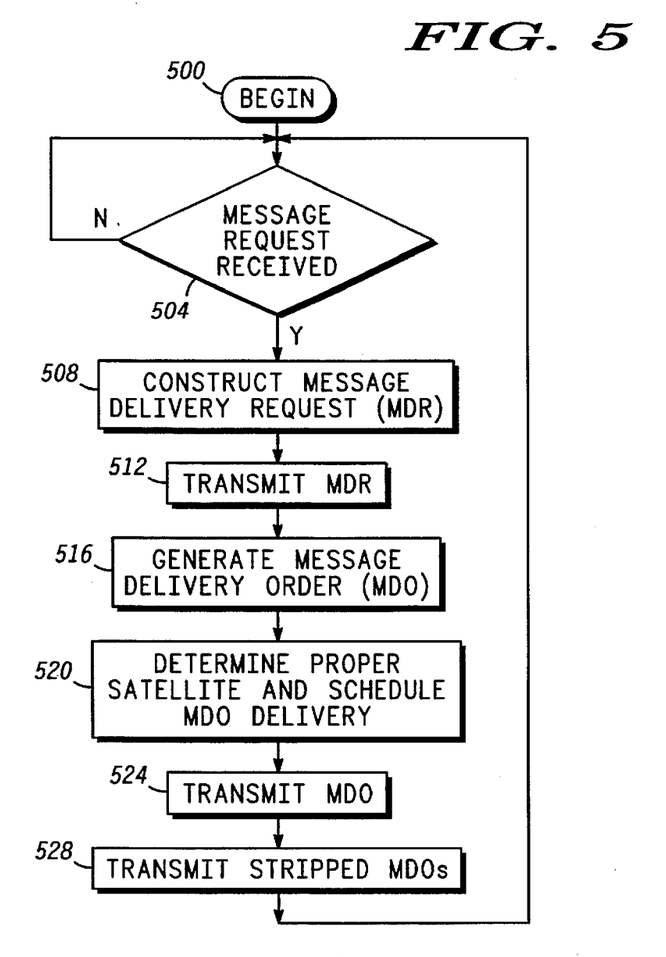
FIG. 5 shows a flowchart of a method for coordinating and delivering messages in accordance with a preferred embodiment of the present invention.

FIG. 5 shows a flowchart of a method for coordinating and delivering messages in accordance with a preferred embodiment of the present invention. The method begins (block 500) by an MOC determining (block 504) whether a message request is received from a source unit. If a message request is not received (block 504), the method iterates as shown in FIG. 5. If a message request is received (block 504), the Construct Message Delivery Request process (block 508) evaluates the message request to determine to which timing block the target SU is assigned. The Construct Message Delivery Request process (block 508) determines which MTC corresponds to the target SU's assigned timing block and constructs an MDR.

Next, the Transmit MDR process (block 512) transmits the MDR to the appropriate MTC. The Generate Message Delivery Orders process (block 516) collects MDRs and groups MDRs together that specify target units that are in the same delivery area. The Generate Message Delivery Orders process (block 516) creates Message Delivery Orders (MDOs) which comprise one or more messages to be delivered during the same timing block.

The Determine Proper Satellite and Schedule MDO Delivery process (block 520) then determines when to transmit the MDO and to which satellite to transmit the MDO to based on the satellites' future locations. The Determine Proper Satellite and Schedule MDO Delivery process (block 520) generates a schedule for delivering each MDO.

The Transmit FIDO process (block 524) then transmits the scheduled MDOs to the appropriate satellite prior to the timing block during which the satellite is scheduled to deliver the message (i.e., before the assigned timing block for the target unit). After the satellite receives the MDO, the Transmit Stripped MDOs process (block 528) strips off timing and control information from the MDO and transmits the stripped MDO to the target units at the scheduled delivery time (i.e., the specific timing block to which the target units are assigned). The procedure then iterates as shown in FIG. 5. It would be obvious to one of skill in the art based on the description herein that the processes in the method depicted in FIG. 5 may be performed simultaneously for multiple messages.

Figure 6:
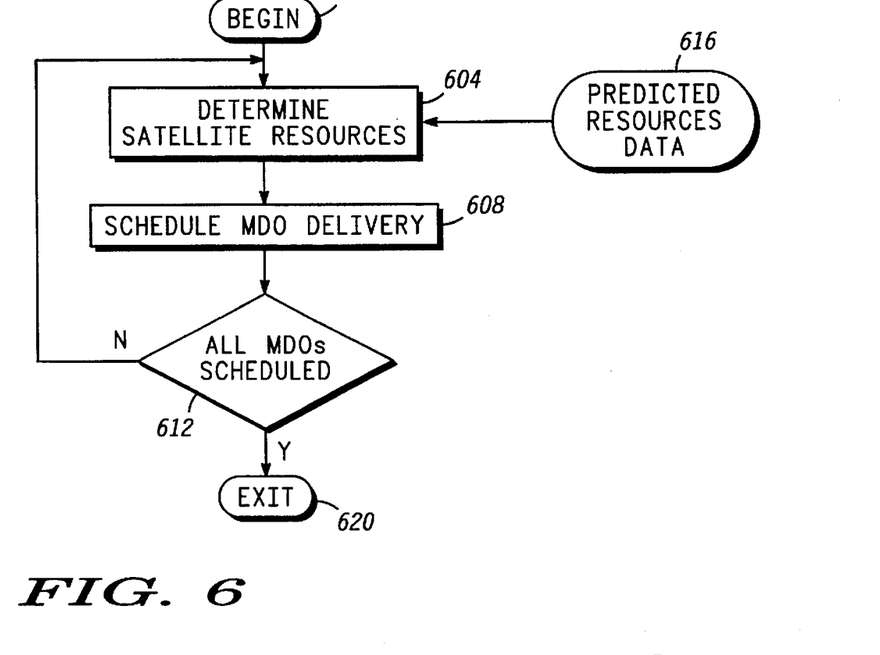
FIG. 6 shows a flowchart of a method for determining a proper satellite and scheduling delivery of a message in accordance with the present invention.

FIG. 6 shows a flowchart of a method for determining a proper satellite and scheduling delivery of MDOs in accordance with the present invention. The method corresponds to the Determine Proper Satellite and Schedule MDO Delivery process (block 520) shown in FIG. 5. The method begins (block 600) by performing the Determine Satellite Resources process (block 604). The Determine Satellite Resources process (block 604) evaluates Predicted Resource Data (block 616) to determine the quantity of resources available to satellites which could potentially broadcast stripped MDOs to target units. The Determine Satellite Resources process (block 604) then provides a list of satellite transmission opportunities for future MDO deliveries.

In the distributed-MTC architecture, the list is divided according to timing block (e.g., timing blocks 202, 204, 206, 208, FIG. 2), such that resources available for each timing block are only available to the MTC which is assigned to that timing block. For example, for each timing block in several consecutive frames (e.g., frame 200, FIG. 2), the list may indicate how many MDOs each satellite is capable of delivering.

The Schedule MDO Delivery process (block 608) then schedules the MDO to be delivered during the satellite transmission opportunities. During a given opportunity, only the quantity of MDOs that do not exceed the satellite resources should be scheduled to be delivered. MDOs that exceed the satellite resources for that opportunity should be scheduled to be delivered during a later frame or to a different satellite that is capable of delivering the MDO.

The method then determines (block 612) whether all MDOs have been scheduled for delivery. When all MDOs have not been scheduled for delivery, the method iterates as shown in FIG. 6. When all MDOs have been scheduled for delivery, the procedure exits (block 620).

Figure 7:
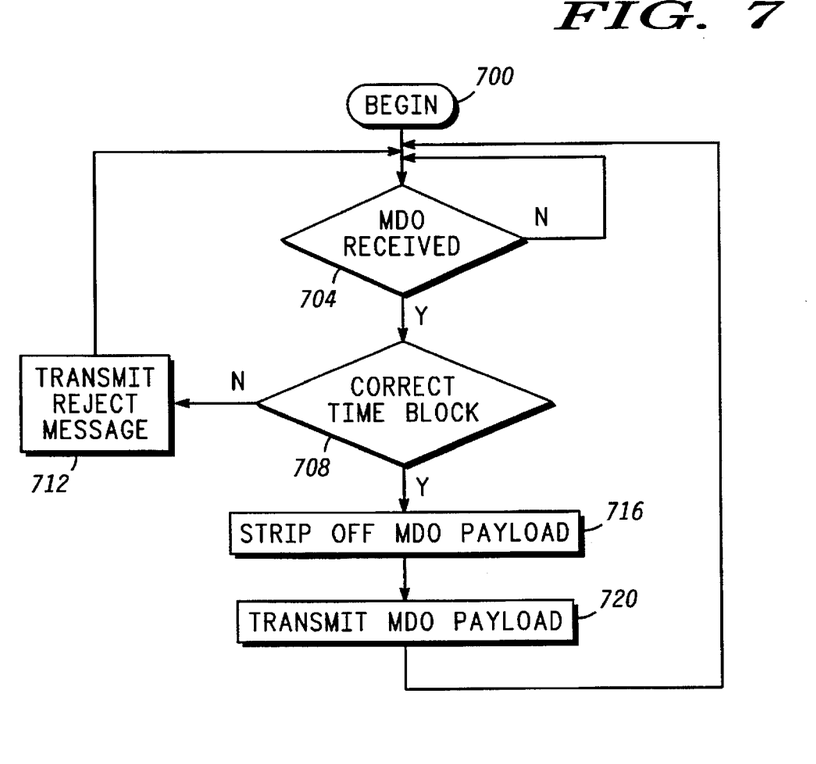
FIG. 7 shows a flowchart of a method for controlling delivery of messages in accordance with the present invention.

FIG. 7 shows a flowchart of a method for controlling delivery of messages in accordance with the present invention. The method begins (block 700) when the satellite determines (block 704) whether it has received an MDO. When the satellite has not received an MDO (block 704), the method iterates as shown in FIG. 7. When the satellite has received an MDO (block 704), the satellite determines (block 708) whether the MDO was received during the correct timing block. For example, a correct timing block may be any timing block where there is enough time to prepare a stripped MDO prior to the scheduled delivery time.

When the satellite determines (block 708) that the MDO was not received during the correct timing block, the Transmit Reject Message process (block 712) sends a reject message to the MTC that transmitted the MDO to notify the MTC to reschedule the delivery of the MDO. The procedure then iterates as shown in FIG. 7.

When the satellite determines (block 708) that the MDO was received during the correct timing block, the Strip Off MDO Payload process (block 716) strips the control information from the MDO. The Transmit MDO Payload process (block 720) then broadcasts the stripped MDO payload during the scheduled timing block. The method then iterates as shown in FIG. 7. It would be obvious to one of skill in the art based on the description herein that multiple MDOs may potentially be processed simultaneously by a particular satellite.

Figure 8:
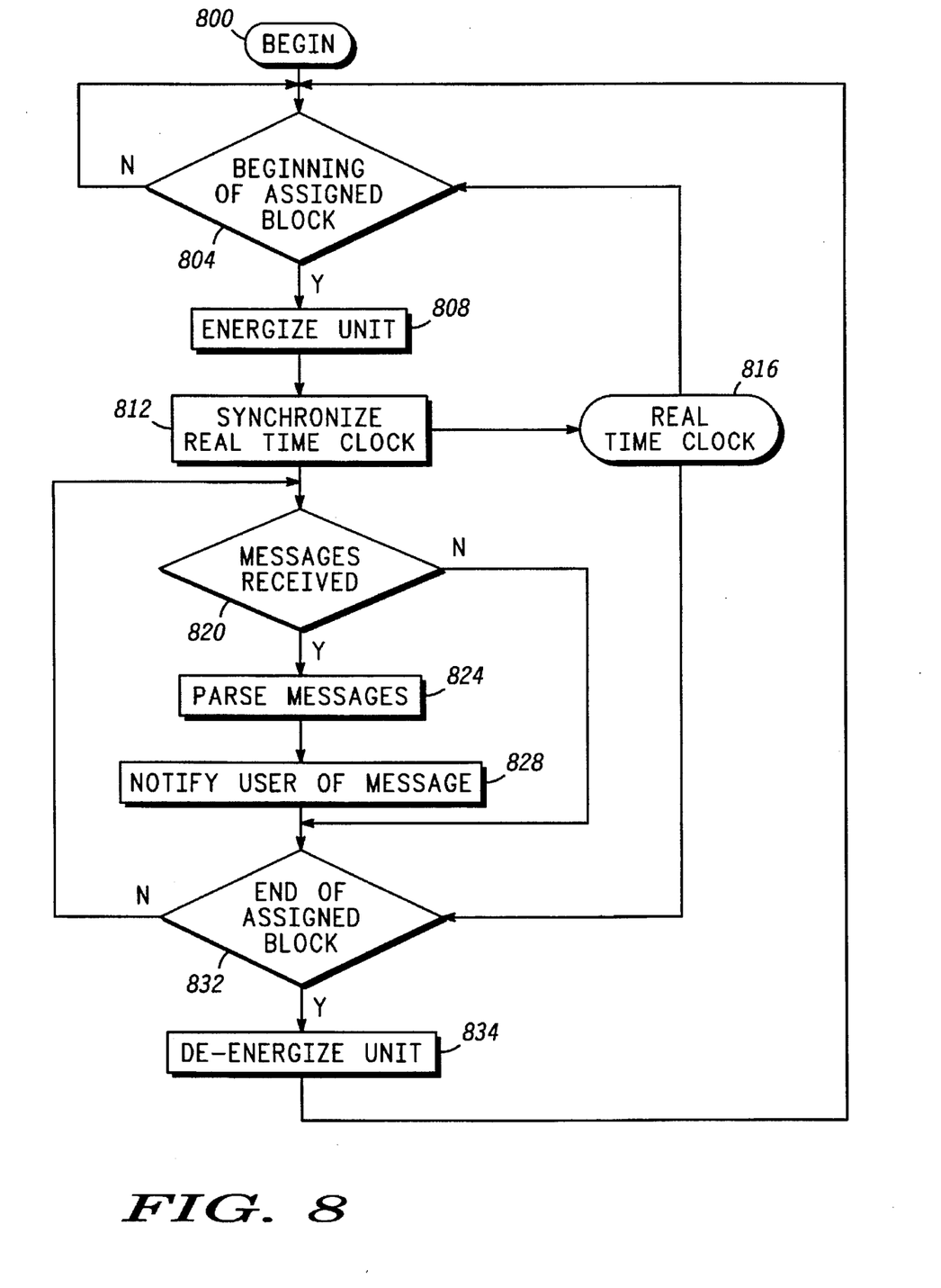
FIG. 8 shows a flowchart of a method for receiving and displaying messages in accordance with the present invention.

FIG. 8 shows a flowchart of a method for receiving and displaying messages in accordance with the present invention. The method begins (block 800) when an SU determines (block 804) whether a beginning of an assigned block will soon be reached by evaluating the Real Time Clock (block 816). When a beginning of an assigned block will not soon be reached (block 804), the procedure iterates as shown in FIG. 8. When a beginning of an assigned block will soon be reached (block 804), the Energize Unit process (block 808) is performed. The Energize Unit process (block 808) brings the SU from a low-power idle state to an active state during which it may monitor satellite signals for messages.

Next, the Synchronize Real Time Clock process (block 812) evaluates an acquisition group (e.g., acquisition group 210, FIG. 2) and synchronizes the SU's Real Time Clock (block 816) to the satellite system time. In an alternate embodiment, the Synchronize Real Time Clock process (block 812) may be performed only occasionally.

The SU then determines (block 820) whether a message has been received in a message group (e.g., message groups 212–218, FIG. 2). When a message has been received (block 820), the Parse Messages process (block 824) parses out any stripped MDOs destined for that particular SU. The Notify User of Message process (block 828) then notifies the user that a message has been received (e.g., through vibratory, audible, or visual means).

After the Notify User of Message process (block 828), or when no message has been received (block 820), the SU determines (block 832) whether the end of the assigned timing block has been reached by evaluating the Real Time Clock (block 816). When the end of the assigned timing block has not been reached (block 832), the process iterates as shown in FIG. 8. When the end of the assigned timing block has been reached (block 832), the De-Energize Unit process (block 834) causes the SU to enter a low-power state. The procedure then iterates as shown in FIG. 8. One advantage of the method is that the SU requires significantly less energy (e.g., stored energy in batteries) using the timing blocked structure. However, in an alternate embodiment the Energize Unit process (block 808) and the De-Energize Unit process (block 834) need not be performed. The SU may remain capable of receiving messages at all times that it is powered up.

In summary, a method and apparatus have been described that allow simplex messages to be delivered to communication units using a blocked messaging structure. One advantage over the prior art is that the method and apparatus described has the capability to coordinate and deliver messages to target units located in geographically-diverse areas outside the range of a single system transmitter without interference. The ability to coordinate and deliver messages provides the further advantage over the prior art of allowing for roughly uniform loads to be distributed among multiple MTCs, thus increasing the message-carrying capacity of the communication system. This advantage is achieved with no conflict in demands upon the satellites from the various MTCs.

Another advantage over the prior art is that the method and apparatus described has the ability to deliver messages to a large area of the earth's surface without invasive antenna structures. This is provided for using transmission antennas on board multiple satellites having improved range over ground-based systems.

Another advantage over the prior art is that the method and apparatus described provides an improved probability that a target unit will receive messages addressed to it. This is achieved by retransmitting messages, and also by the inherent backup capability that allows messages to be delivered through different MTCs when the message-carrying ability of one MTC is diminished.

Another advantage over the prior art is that stored energy within the SUs is preserved by using a blocked message structure.

In summary, the method and apparatus of the present invention increases the range, capacity, and reliability of simplex data communication systems without degradation in performance.

What is claimed is:

1. A method of operating a message delivery system having at least one message control segment, at least one transceiving apparatus that predictably changes a position with respect to a surface of a celestial body, and multiple subscriber units each having an assigned receive timing block, the method performed by a transceivingapparatus comprising the steps of:

a. receiving one or more messages to be delivered to one or more subscriber units by a transceiving apparatus during a scheduled delivery time which corresponds to at least one assigned receive timing block of the one or more subscriber units, wherein the scheduled delivery time can be a future time which is a time when the transceiving apparatus is predicted to be located within communication range of the one or more subscriber units, each message specifies a particular subscriber unit and the particular subscriber unit is capable of receiving messages during the assigned receive timing block;

b. stripping off a message delivery payload from the one or more messages to be delivered; and c. transmitting the message delivery payload during the scheduled delivery time.

2. The method of operating the message delivery system as claimed in claim 1 further comprising the steps of:

d. determining, after the receiving step and before the transmitting step, whether a particular message is received at a correct time prior to the scheduled delivery time; and e. if the particular message is not received during the correct time, transmitting a reject message to a message control segment, otherwise performing step (b).

3. A method of operating a simplex data communication system having at least one message origination controller (MOC), at least one message termination controller (MTC), at least one transceiving apparatus that predictably changes a position with respect to a surface of a celestial body, and multiple subscriber units, each subscriber unit having an assigned receive timing block, the method comprising the steps of:

a. receiving, by an MOC, a message that identifies one of the multiple subscriber units as a target unit;

b. transmitting, by the MOC, the message to an MTC having an assigned transmit timing block that corresponds to an assigned receive timing block of the target unit;

c. scheduling, by the MTC, a delivery time for the message wherein the scheduled delivery time is a time when the transceiving apparatus is predicted to be located within communication range of the one or more subscriber units; and d. sending the message, by a transceiving apparatus, to the target unit during the delivery time.

4. A method of operating a message delivery system using scheduled transmissions of messages during a timing frame comprised of multiple timing blocks, wherein the message delivery system has at least one message origination controller (MOC), at least one message termination controller (MTC), one or more transceiving apparatus coupled to the at least one message termination controller, and multiple subscriber units, the method comprising the steps of:

a. receiving, by an MOC, a message request that identifies one of the multiple subscriber units as a target unit;

b. transmitting, by the MOC, a message contained within the message request to an MTC having an assigned transmit timing block that corresponds to an assigned receive timing block of the target unit;

c. scheduling, by the MTC, a delivery time for the message according to the assigned transmit timing block, wherein the delivery time is scheduled by determining future transmission opportunities by evaluating data describing predicted resources of the one or more transceiving apparatus, and scheduling the delivery time during a future transmission opportunity for a transceiving apparatus; and d. sending, by the transceiving apparatus, the message to the target unit during the delivery time.

5. The method of operating the message delivery system as claimed in claim 4 further comprising the step of:

e. constructing by the MOC before step (b) of transmitting the message, a message delivery request containing the message.

6. The method of operating the message delivery system as claimed in claim 4 wherein step (c) further comprises the steps of:

c.1. collecting multiple messages to be delivered by a particular transceiving apparatus;

c.2. determining future transmission opportunities of the particular transceiving apparatus; and c.3. scheduling the delivery time based on the future transmission opportunities.

7. The method of operating the message delivery system as claimed in claim 4 wherein the one or more transceiving apparatus move in predictable paths with respect to a surface of a celestial body and step (c) further comprises the step of:

c.1. scheduling the delivery time based on a predicted location of the particular transceiving apparatus.

8. The method of operating the message delivery system as claimed in claim 7 wherein step (c) further comprises the steps of:

c.2. determining a particular transceiving apparatus that should be capable of transmitting the message to the target unit at the delivery time; and c.3. sending the message to the particular transceiving apparatus prior to the delivery time.

9. The method of operating the message delivery system as claimed in claim 4 wherein step (d) further comprises the step of:

d.1. stripping off control information prior to the step of transmitting the message to the target unit.

10. The method of operating the message delivery system as claimed in claim 4 wherein step (d) further comprises the step of:

d.1. broadcasting the messages to an area containing the target unit.

11. The method of operating the message delivery system as claimed in claim 4 further comprising the step of:

e. resending the message after a period of time.

12. The method of operating the message delivery system as claimed in claim 4, wherein the target unit is manufactured in a factory before becoming a part of the message delivery system, and prior to step (a) of receiving the message request for the target unit, the method further comprises the steps of:

e. randomly determining, in the factory, the assigned receive timing block of the timing frame that the target unit will be assigned to; and f. programming, in the factory, the assigned receive timing block into the target unit.

13. The method of operating the message delivery system as claimed in claim 4 further comprising the step of:

e. sending, by the MTC, the message to the transceiving apparatus prior to the delivery time.

14. In a message delivery system having at least one message control segment, at least one transmission antenna, and multiple subscriber units each having an assigned receive timing block and a real time clock, a method performed by a subscriber unit comprising the steps of:

a. comparing the real time clock to the assigned receive timing block to determine whether a beginning of a next receive timing block will soon be reached;

b. when the beginning of the next receive timing block will soon be reached, energizing the subscriber unit such that the subscriber unit is capable of receiving messages;

c. evaluating each received message to determine whether the received message is addressed to the subscriber unit;

d. if the received message is addressed to the subscriber unit, parsing the received message, otherwise performing step (e);

e. determining whether the next receive timing block has ended; and f. if the next receive timing block has ended, de-energizing the subscriber unit, otherwise returning to step (c).

15. The method of operating a message delivery system as claimed in claim 14 further comprising the step of:

g. synchronizing the real time clock.

16. The method of operating a message delivery system as claimed in claim 14 further comprising the step of:

g. notifying a user of the subscriber unit that the received message has been received by displaying the received message.

17. A method of operating a message delivery system having one or more message origination controllers (MOCs), one or more message termination controllers (MTCs) multiple subscriber units, and multiple transceiving apparatus, the method comprising the steps of:

a. assigning to each subscriber unit an assigned receive timing block within a timing frame;

b. assigning to each MTC one or more assigned transmit timing blocks within the timing frame;

c. receiving, by an MOC, a message from a source unit that specifies a target unit;

d. transmitting, by the MOC, the message to an MTC having an assigned transmit timing block that corresponds to the assigned receive timing block of the target unit;

e. scheduling, by the MTC, a delivery time for the message and determining a transceiving apparatus located in proximity to the area of the target unit during the delivery time;

f. transmitting the message by the MTC to the transceiving apparatus; and g. transmitting, by the transceiving apparatus, the message to the target unit during the delivery time.

18. The method of operating the message delivery system as claimed in claim 17 wherein step (e) of schedule the delivery time comprises the step of:

e.1. batching, by the MTC, the message with other messages to be delivered to the transceiving apparatus located in the proximity of the target unit.

19. A message delivery system using scheduled transmissions of messages during a timing frame comprised of multiple timing blocks, said system comprising:

one or more message origination controllers (MOCs) that receive messages from source units to be delivered to target units;

one or more message termination controllers (MTCs), coupled to the one or more MOCs, that are assigned transmit timing blocks corresponding to one or more of the multiple timing blocks of the timing frame wherein an MTC schedules delivery times for the messages by determining future transmission opportunities from data describing predicted resources of one or more transceiving apparatus, and scheduling the delivery times during future transmission opportunities of a transceiving apparatus;

the one or more transceiving apparatus capable of receiving messages from the one or more MTCs and capable of transmitting messages to target units; and multiple target units, wherein a target unit is assigned one or more assigned receive timing blocks corresponding to one or more of the multiple timing blocks of the timing frame, and wherein the target unit is capable of receiving messages from the one or more transceiving apparatus during the one or more assigned receive timing blocks.

20. A message delivery system using scheduled transmissions of messages during a timing frame comprised of multiple timing blocks, said system comprising:

one or more message origination controllers (MOCs) that receive messages from source units to be delivered to target units;

a message termination controller (MTC) for scheduling delivery of the messages, coupled to the one or more MOCs, wherein an MTC schedules delivery times for the messages by determining future transmission opportunities from data describing predicted resources of one or more transceiving apparatus, and scheduling the delivery times during future transmission opportunities of a transceiving apparatus;

the one or more transceiving apparatus capable of receiving messages from the MTC and capable of transmitting messages to target units; and multiple target units, wherein a target unit is assigned one or more assigned receive timing blocks corresponding to one or more of the multiple timing blocks of the timing frame, and wherein the target unit is capable of receiving messages from the one or more transceiving apparatus during the one or more assigned receive timing blocks.

21. A message delivery method comprising the steps of:

a. receiving in a message origination controller (MOC) from a source unit, a message intended for a target unit and identifying a message termination controller (MTC) capable of accessing a time slot in which the target unit is able to receive messages;

b. sending said message from the MOC to the identified MTC including time slot identification information;

c. scheduling delivery of said message so as to arrive at a satellite transmitter capable of communicating with the target unit during the target unit's receive time slot;

d. transmitting said message from the MTC to the satellite transmitter at a time suitable for retransmission to the target unit; and e. removing from the message said time slot identification information prior to transmitting the message from the satellite transmitter to the target unit during the target unit's receive time slot.

* * * * *